(12) United States Patent
Tischler

(10) Patent No.: US 12,540,617 B1
(45) Date of Patent: Feb. 3, 2026

(54) MULTI-COMPONENT PLUNGER SEAL SYSTEM FOR A PUMP AND METHOD

(71) Applicant: HYDRABLAST TECHNOLOGIES, INC., Houston, TX (US)

(72) Inventor: Dieter A. Tischler, Houston, TX (US)

(73) Assignee: HYDRABLAST TECHNOLOGIES, INC., Houston, TX (US)

( * ) Notice: Subject to any disclaimer, the term of this patent is extended or adjusted under 35 U.S.C. 154(b) by 0 days.

(21) Appl. No.: 19/082,284

(22) Filed: Mar. 18, 2025

Related U.S. Application Data

(60) Provisional application No. 63/567,029, filed on Mar. 19, 2024.

(51) Int. Cl.
*F04B 53/16* (2006.01)

(52) U.S. Cl.
CPC .......... *F04B 53/164* (2013.01); *F04B 53/166* (2013.01)

(58) Field of Classification Search
CPC ................ F04B 53/164–53/166; F16J 15/166
See application file for complete search history.

(56) References Cited

U.S. PATENT DOCUMENTS

| | | | | |
|---|---|---|---|---|
| 3,606,356 A | * | 9/1971 | Beroset | F16J 15/56 277/584 |
| 4,231,578 A | * | 11/1980 | Traub | F16J 15/166 277/572 |
| 5,050,895 A | * | 9/1991 | Hashish | F16J 15/48 277/584 |
| 5,493,954 A | * | 2/1996 | Kostohris | F16J 15/164 277/928 |
| 6,758,478 B1 | * | 7/2004 | Moreno | B60T 8/3675 277/587 |
| 7,568,424 B2 | * | 8/2009 | Hopkins | F04B 53/162 417/415 |
| 9,249,797 B2 | * | 2/2016 | Byrne | F16J 15/56 |
| 11,125,332 B2 | * | 9/2021 | Hu | F16J 15/166 |

* cited by examiner

*Primary Examiner* — Vishal A Patel
(74) *Attorney, Agent, or Firm* — Jackson Walker LLP

(57) ABSTRACT

A plunger seal system seals in a cylinder with a bore and a plunger slidably engaged in the bore. A seat for the plunger to slide therein restrains longitudinal movement of the system. A seat surface has a conical shape to interface with a backup ring with a conical shape. A U-cup seal adjacent the ring faces a cylinder pressurized portion. A longitudinal sleeve is radially disposed inward of the ring and U-cup seal and outward of the plunger. At low pressures, the U-cup seal is the primary seal. At medium pressures, the U-cup seal presses against the ring, expanding the ring and increasing sealing capacity. At higher pressures, the ring contracts radially around the sleeve to compress the sleeve toward the plunger to seal against the plunger. The system is sealing capable at low pressures through high pressures and can fully function with commercial tolerances for reduced expense.

6 Claims, 8 Drawing Sheets

US 12,540,617 B1

MULTI-COMPONENT PLUNGER SEAL SYSTEM FOR A PUMP AND METHOD

CROSS REFERENCE TO RELATED APPLICATIONS

This application claims the benefit of U.S. Provisional Application No. 63/567,029, filed Mar. 19, 2024, entitled "Multi-component Plunger Seal System" and is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to liquid pump seals. More specifically, the disclosure relates to systems and methods for sealing plungers in pumps.

Description of the Related Art

Positive displacement pumps of the reciprocating plunger style, typically triplex with three cylinders or quintuplex with five cylinders, require sealing elements on the plunger to enable pumping a fluid. The specific design of the plunger seals is influenced by many factors, including desired output pressure, pump component surface finish, reciprocation speed, chemical and physical properties of the pumped fluid, stroke length of the plunger, and other factors.

In high-pressure pumps operating at greater than 10,000 psi, special consideration is given to the sealing elements, because the pressure loads become extremely high and fluid-containing components expand due to internal pressure. Further, the sequence of sealing the progressive components and retraction can occurs in commercial embodiments at rates approaching 35 times per second. Thus, sealing systems that might function at slower speeds can rapidly fail. Seal materials and designs must provide adequate physical properties to resist being crushed, and resist extrusion through very small spaces created during such pressurization of the pressure-bearing pump components. Yet, seals must be flexible enough to be energized at low pressure, still seal to prevent leakage at high pressure, while being heat resistant to withstand temperature gradients due to friction and small leakages.

The pumping component expansion problem from the high pressures creates a sealing volume with variable cross-sectional size as the pump plunger reciprocates to produce pressure. To address the variable sealing volume problem, pump seals focus on sealing against the plunger surface at their inside diameter, while an additional seal is often employed to produce a liquid-tight seal at the outside diameter of the seal.

Often, successful seal design functioning is limited to a particular configuration of hardware that makes portability to another design very difficult, and sometimes, impossible. In the pursuit of improved performance, it is a common practice to adapt sealing features that work in one pump design and combine them with other design features to realize a benefit. In most cases, merging the constraints of an existing design with new design constraints proves insurmountable.

FIG. 1A is a schematic partial isometric sectional view of a typical high pressure pump cylinder with a dashed portion representing a typical plunger seal system. FIG. 1B is a schematic cross-sectional side view typical high pressure pump cylinder of FIG. 1A with a dashed portion representing a typical plunger seal system. FIG. 1C is an enlarged schematic partial cross sectional side view of the high-pressure pump cylinder representing a typical plunger seal system in the dashed zone of FIG. 1B. A typical high-pressure pump (not shown) includes at least one such high pressure cylinder 2 formed with a bore 4 for receiving components described herein. Typically, the pump will have several high-pressure cylinders to produce a desired high-pressure volume. A plunger 6 is slidably engaged in the bore for reciprocal longitudinal movement in a pumping function. A seal seat 8 forms an annular sealing element around the plunger. An extension of the seal seat is sized to fit within the bore 4 where an end 10 of the seal seat forms an inside conical surface that slopes angularly from the outer diameter of the end into the material of the seal seat forming an inside conical surface with the cone maximum diameter facing the end 10. A high-pressure packing 12 is disposed in the bore 4 adjacent the seal seat 8 and has an end 13 forming an outside conical surface for matingly engaging the inside conical surface of the seat end 10.

The other end 14 of the high-pressure packing 12 faces into a pressure portion 26 of the cylinder. An annular groove formed into the end 14 creates a pair of flexible annular flaps 15A and 15B that engage radially adjacent surfaces for sealing. An O-ring 16 is disposed between the outer diameter of the high-pressure packing 12 and the bore 4. A back nut 17 is adjustably attached to an end of the cylinder 2 and holds the seal seat 8 in position in the cylinder. An annular guide bearing 9 is coupled in a bore of the seal seat adjacent a face of the seal seat.

At the distal end of the cylinder from the back nut, a spacer tube 18 is disposed in the bore 4. The spacer tube 18 has a portion that forms a spring guide 20 that is sized in diameter to allow insertion into an inner diameter of the spring 22 located in the bore. The bias of the spring 22 against the spring guide 20 in the bore 4 helps maintain the spacer tube 18 into the annular volume between the plunger 6 and the cylinder bore 4 throughout the reciprocal movement of the plunger. The spacer tube 18 reduces the unnecessary fluid volume in the annulus between the inside diameter of the cylinder bore 34 and the outside diameter of the plunger 36 to reduce energy for compression of the active fluid in the bore between the plunger and a valve 23 at the distal end of the cylinder from the back nut 17. The valve 23 open and closes based on pressure and vacuum in the reciprocal movement of the piston and seats against a valve seat 24 at an end of the cylinder distal from the back nut. Fluid is brought through the valve 23 into the bore 4 on a suction stroke and then pumped on a pumping stroke to a higher pressure in the bore to exit the valve 23 with a higher-pressure fluid.

The high pressure packing 12 is an ultra-high molecular weight polyethylene (UHMW PE) semi-rigid plastic and together with a semi-rigid polyurethane O-ring 24 comprises a main sealing element function. The packing 12 and O-ring 16 are positioned close to an end of the suction stroke of the pump as the plunger 6 moves through the seal seat 8. During operation, at the start of the pumping stroke, pressure in the bore 4 forces the end 14 of the packing 12 having the flaps 15A and 15B to initiate a circumferential seal between the bore surface and plunger 6 and thereby build pressure. The material of the packing 12 is of sufficient flexibility that pressurizing of the fluid can begin at this stage and prevent the pumped fluid from leaking past the packing 12 along plunger 6 to a drain path. If the sealing action is successful, the pressure can build further on the pumping stroke, and the sealing effect can then be achieved when a right-sized interference fit exists between the plunger 6 and the bore 4. The O-ring 16 produces a supplementary radial compressive force on the plunger 6 through the packing 12. Furthermore, the pressure on the inside of the bore 4 causes the bore inner diameter to expand outwardly, requiring the packing 12 to close the resulting expansion gap. The packing 12 is forced axially into the conical face of the end 10 on the seal seat 8 from the pressure load produced on the end 14. The axial compressive force deforms the packing 12 in such a way that the inside and outside diameters press more tightly against the cylinder 2 and plunger 6, while its length correspondingly decreases slightly. The semi-rigid UHMW PE of the packing 12 is suited for this shape change and can accommodate the larger inner diametric change of cylinder 2. Additionally, the conical face on the end 10 directs the packing 12 downwardly onto the plunger and produces yet another sealing effect on the plunger 6. The composite of the sealing effects facilitates pumping fluid out of the cylinder and into a high-pressure system. In this design, the wetted parts are the plunger 6, the fluid-facing portion of packing 12, the spacer tube 18, and the bore 4 of the cylinder 2. The seal seat 8 does not provide a sealing function around the plunger 6 for the pumped fluid.

The main problem associated with the design of the prior art in FIGS. 1A-1C is the difficulties of achieving and holding required tolerances. Manufacturing tolerances of these parts are extremely small, and a total variation of 0.001"-0.002" diametric interference or clearance makes a significant difference in the ability of the packing 12 to function as a seal. Too little interference between the fitting parts and the packing will not energize at low pressure at the start of the pumping stroke and it will leak. Too much interference and friction force on plunger 6 will be so high that the heat generated causes the packing 12 to degrade very quickly, sometime even within a few minutes of operation. The result in either case is that the fluid leaks past the packing 12 that requires a replacement of the packing 12. Further, the end 14 with the sealing flaps 15A and 15B benefits by a deep groove for more flexibility in movement for initial sealing beginning at low pressures. However, if the groove is too deep, longitudinally circular cracks form in the packing 12 at the bottom of the groove between the flaps, due to tensile forces imposed by the pressure acting on the sides of the flaps. Generally, the failure rate of the design of FIGS. 1A-1C is problematic for the operator on many jobs and causes excessive down-time for maintenance and a loss of significant production in an industry that demands high up-time.

FIG. 2 is a schematic partial cross sectional side view of another typical plunger seal system. A cylinder 60 has a bore 64 into which a plunger 66 is slidably engaged. A spacer tube 62 is slidably engaged in an annulus formed between the diameter of the bore 64 and the outside diameter of the plunger 66. A seal holder 68 is formed with a thin-walled seal holder extension 78 that extends into the bore 64. The outside diameter of the seal holder extension 78 has a clearance to the diameter of the cylinder bore 64 that creates a cylindrical clearance section 79 as an annulus. Further, the seal holder extension 78 is longitudinally aligned with the spacer tube 62 to form a seal cavity 70 at their juncture with a portion of an inside diameter of the seal holder extension forming an outside diameter of the seal cavity, and a sleeve 76 forming an inside diameter of the seal cavity. The seal holder 68 provides a rearward abutment for the U-cup seal 72. A U-cup seal 72 fits in the seal cavity 70 with the radial inward and outward flaps of the seal facing the spacer tube 62 toward a pressure portion 26 of the system. A sleeve cavity 74 is formed jointly on the inside diameters of the spacer tube 62 and the seal holder 68 and is radially inward from the seal cavity 70. The sleeve 76 fits in the sleeve cavity 74, is longer than the U-cup seal 72, and radially inward from the U-cup seal. The sleeve 76 can seal circumferentially around the outside diameter of the plunger 66. An inside diameter of the U-cup seal 72 can circumferentially seal around the outside diameter of the sleeve 76. An outside diameter of the U-cup seal 72 can seal against an inside diameter of the seal holder extension. High pressure fluid can flow into the cylindrical clearance section 79 and leak without a seal. A high-pressure seal to avoid the fluid leakage is matingly formed at a contact region 82 between a back end of the cylinder 60 and a corresponding front end of the seal holder 68 that is generally curved to make line contact with the cylinder end.

The operating principle has a few similarities to the plunger seal system of FIGS. 1A-1C with some distinctions. The sleeve 76 is made of semi-rigid UHMW PE similar to the high pressure packing 12 in FIGS. 1B-1C. The U-cup seal 72 is made of a very flexible material, such as Buna-N or Viton rubber compounds used in many standard O-rings. Thus, any support structure needs to provide a contiguous, inseparably bounded region into which the U-cup seal 72 is deformed under pressure due to the seal's very low structural capacity to resist deformation under pressure. This system contrasts with the system of FIGS. 1A-1C that has much higher structural strength and rigidity and thus able to withstand pressure loads better.

When the pumping action begins, pressure builds in the bore 64 during the pumping stroke of the plunger 66 and acts on the U-cup seal 72 with similar outward and inward flaps as the V-groove of the high pressure packing 12 of FIG. 1C. The resulting circumferential seal by the flaps of the U-cup seal 72 on the sleeve 76 helps prevent leakage of fluid past the U-cup seal. The highly flexible properties of U-cup seal 72 mean that even when slightly pressurized, the U-cup seal 72 exerts an outward force on the inside diameter of the seal holder extension 78 and an inward force on the sleeve 76 that in turn exerts an inward force on the plunger 66 in the region of the U-cup seal 72, so that a circumferential seal can be formed between the U-cup seal and sleeve and between the sleeve and plunger. As the pressure continues to increase, the pressure increases a circumferential clamping force for sealing around the plunger. As the pressure increases further, the portion of sleeve 76 protruding into the pressurized fluid is wrapped with the pressurized fluid, and the effect is to further deform the sleeve 76 onto the plunger 66 to increase the sealing surface. The combined effect of the deformation in the region of U-cup seal 72 and the clamping force from the pressure-wrapped portion of the sleeve 76 produce an overall sealing effect during a pumping stroke. On the return suction stroke, the U-cup seal 72 and sleeve 76 can relax to a more neutral posture, thus reducing sliding friction of the plunger 66 in the sleeve 76 and increasing service life.

However, at the inner diameter of cylinder 60, the U-cup seal 72 does not produce any sealing effect, in contrast to high-pressure packing 12 in FIG. 1C. The outside diameter of the seal cavity 70 in the seal holder 68 does not provide a seal to the cylinder 60 to contain the pumped fluid. Sealing for this space is created by a secondary sealing, formed by a tangential contact region 82 between a convex surface of seal holder 68 and a conical concave surface of cylinder 60 to form a line-contact, metal-to-metal seal. In the design of the prior art of FIG. 2, the wetted parts are the plunger 66, sleeve 76, U-cup seal 72, seal holder 68, spacer tube 62, and bore 64 of the cylinder 60. Generally, the manufacturing tolerances of the individual components in the design of FIG. 2 are as tight of the tolerances of the design of FIGS. 1A-1C, but the overall design is less sensitive to the aggregate tolerances when assembling the parts together. The result is a more robust design, with improved reliability and less operational disruption, compared to the design of FIGS. 1A-1C.

The main problem associated with the design of FIG. 2 is that the pump design must provide a secondary line contact sealing for sealing the pumped fluid between the seal holder 68 and the cylinder 60 at the contact region 82. The clamping loads required for this secondary line contact sealing are approximately 20-25 times higher than the loads required by the back nut 17 of the design in FIGS. 1A-1C.

Therefore, there remains a need for a design with higher reliability and forgiving tolerances with a singular seal assembly, which would provide reduced forces on components at final assembly for ease of service, and versatility and adaptability to multiple pump configurations.

BRIEF SUMMARY OF THE INVENTION

The disclosure provides a plunger seal system configured to seal in a cylinder with a bore and a plunger slidably engaged in the bore. A seat with a bore for a plunger to slide therein restrains longitudinal movement of the system in at least one direction. A seat surface facing a cylinder pressurized portion has a conical shape to interface with a backup ring adjacent the seat with a reciprocal conical shape. A U-cup seal adjacent the ring faces the pressurized portion so that flaps of the U-cup seal extend outwardly when pressurized. A longitudinal sleeve is radially disposed inward of the ring and U-cup seal and outward of the plunger. At low pressures, the U-cup seal is the primary seal. At medium pressures, the U-cup seal presses against the ring, expanding the ring, and increasing sealing capacity. At higher pressures, the ring contracts radially inwardly sufficiently toward the sleeve to compress the sleeve toward the plunger to seal against the plunger. The plunger system is capable to seal at low pressures and very high pressures without substantial extruding, if any, through gaps in the assembly. The system can fully function with general commercial tolerances for reduced expense in contrast to prior art. The system can last substantially longer with the more tolerant dimensions and clearances for the plunger to longitudinally reciprocate in the cylinder bore.

The disclosure provides a plunger seal system for a pump having a cylinder with a longitudinal bore and a plunger slidably engaged in the bore, the seal system comprising: a cylindrical seat configured to be coupled to the cylinder having a seat ring with an outer diameter configured to extend into the cylinder bore and be restrained longitudinally and an inner diameter configured to allow the plunger to slide therethrough, the seat having an end having a conical face disposed toward a pressurized portion of the cylinder; a backup ring disposed adjacent the cylindrical seat and having a seat ring with an outer diameter configured to extend into the cylinder bore and an inner diameter radially outward from the plunger, the backup ring having a first end with a reciprocal conical face to the conical face of the end of the cylindrical seat and a second end disposed toward the pressurized portion; a seal disposed adjacent the backup ring and having a seat ring with an outer diameter configured to extend into the cylinder bore and an inner diameter radially outward from the plunger, the seal having a first end disposed toward the backup ring and a second end disposed toward the pressurized portion, the second end having a circumferential groove formed in a face of the second end thereby forming a radially inward longitudinal flap configured to seal inwardly against an inner circumferential surface and a radially outward longitudinal flap configured to seal against the cylinder bore; and a sleeve longitudinally aligned with the cylindrical seat, backup ring, and seal and having an outer diameter radially inward of the backup ring and the seal, and an inner diameter configured to allow the plunger to slide therethrough.

The disclosure also provides a method of sealing a plunger slidably engaged in a cylinder bore of a pump, having a cylinder seat at least partially inserted into the cylinder bore, and a cylindrical backup ring, seal, and sleeve inserted into the cylinder core adjacent the cylinder seat comprising: pressurizing the cylinder; activating the seal against cylinder bore and against the sleeve at a first pressure; activating the back up for sealing by applying a second pressure that is a higher pressure than the first pressure against the seal, forcing the seal against the backup ring, and compressing the backup ring longitudinally to expand the backup ring radially and seal against the cylinder bore and the sleeve; and activating the sleeve for sealing, by applying a third pressure that is a higher pressure than the second pressure against seal, forcing the seal more against the backup ring, and compressing the backup ring more longitudinally to expand the backup ring more radially to seal against the cylinder bore and compressing the sleeve radially to seal against the plunger.

Importantly, the backup ring serves as a structural, non-wetted component, and interfaces with both the U-cup seal and the sleeve in sealing capacities. The backup ring is pressed into sealing engagement at elevated pressure by the U-cup seal. The backup ring also provides circumferential clamping forces to the plunger through the conical contact region at its abutment with the seat and achieves this indirectly through acting on sleeve. Thus, the backup ring acts with an additional clamping force in two modes.

DETAILED DESCRIPTION

Figure 1A:
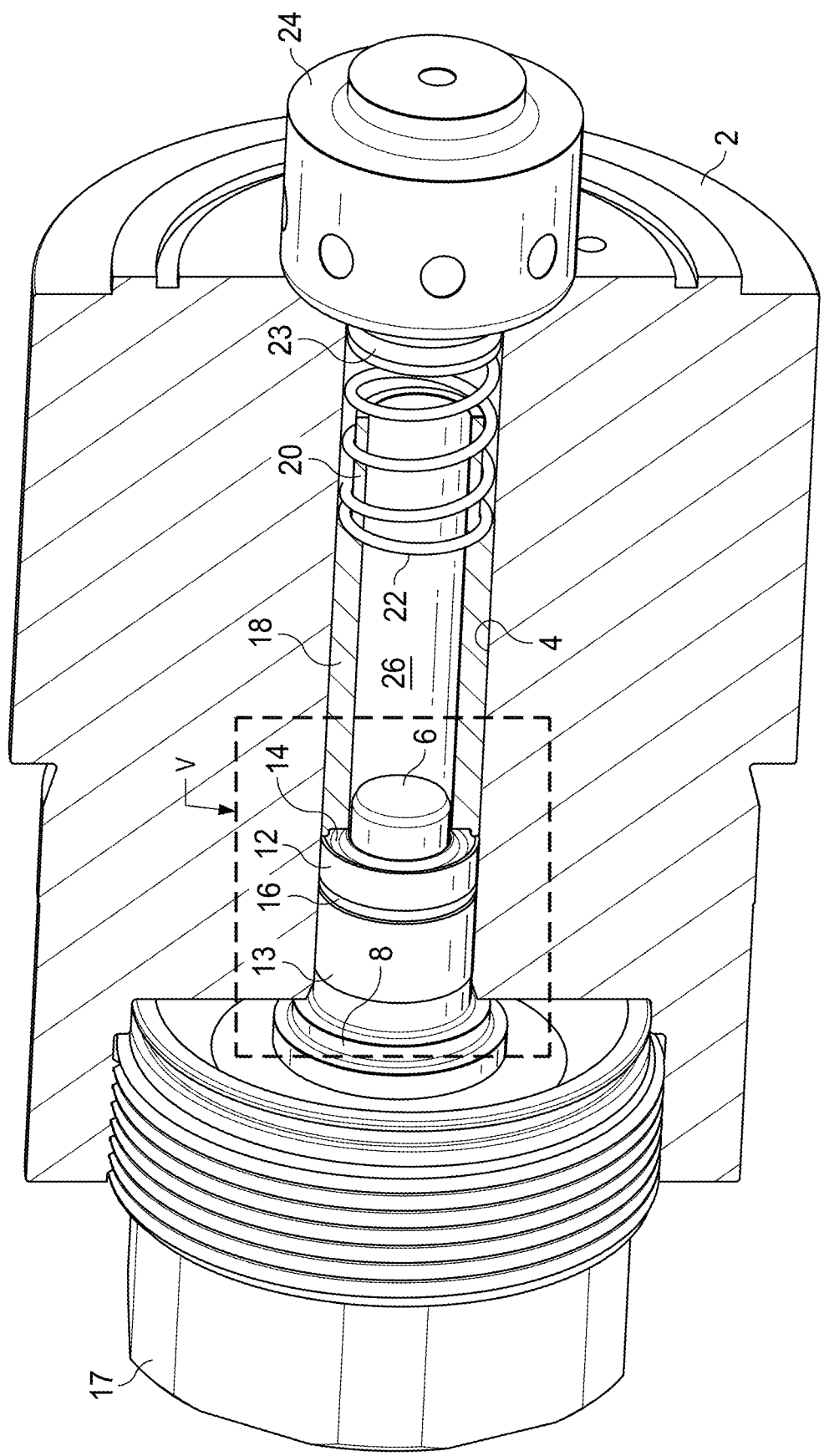
FIG. 1A is a schematic partial isometric sectional view of a typical high pressure pump cylinder with a dashed portion representing a typical plunger seal system.

The Figures described above, and the written description of specific structures and functions below, are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms such as "coupled", "coupling", "coupler", and like are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section or related components, such as seals, washers, fasteners, and the like that are known to those with ordinary skill in the art and may not be specifically described. Similarly, elements have been described functionally and can be embodied as separate components or can be combined into components having multiple functions.

Figure 3:
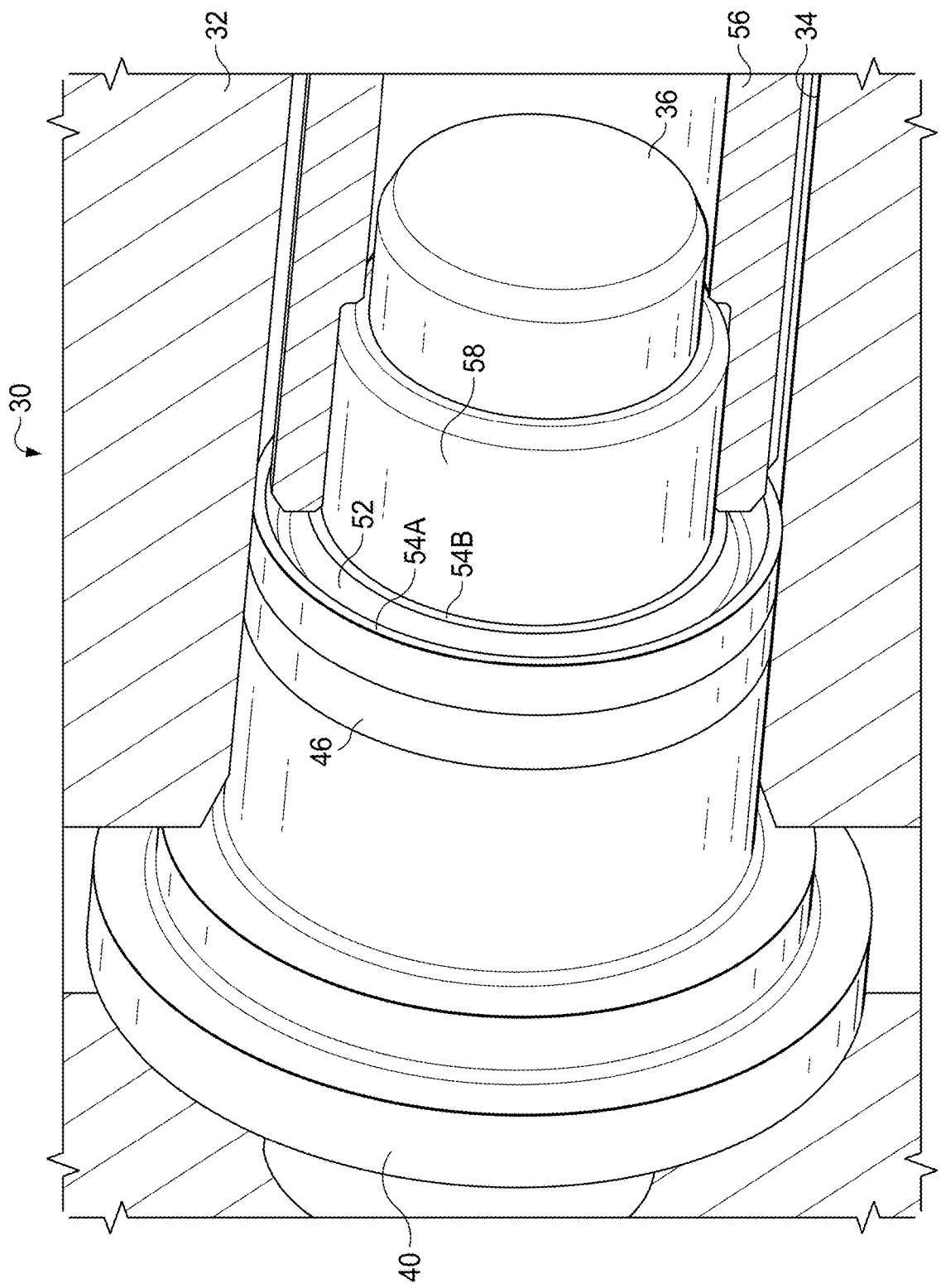
FIG. 3 is a schematic isometric side view of the exemplary plunger seal system of the invention.
Figure 4:
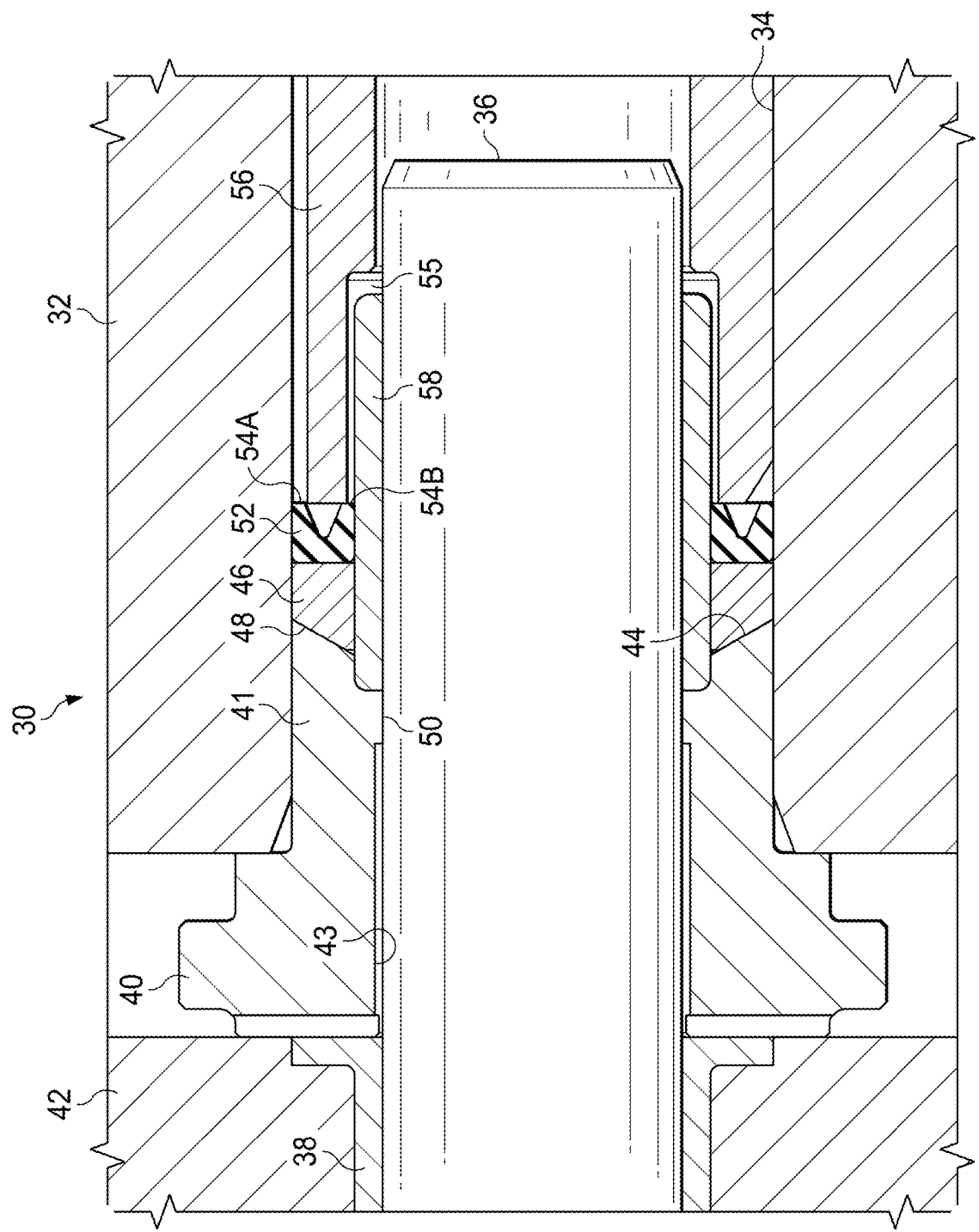
FIG. 4 is a schematic partial cross-sectional view of the exemplary plunger seal system shown in FIG. 3.

FIG. 3 is a schematic isometric side view of the exemplary plunger seal system of the invention. FIG. 4 is a schematic partial cross-sectional view of the exemplary plunger seal system shown in FIG. 3. The plunger seal system 30 of the present invention can be used in multiple pumping systems and is especially advantageous for pumping pressures of at least 10,000 pounds per square inch (psi). For illustration, a high-pressure pump cylinder 32 can be used in a pump generally having multiple cylinders to create a cumulative volume.

Figure 1B:
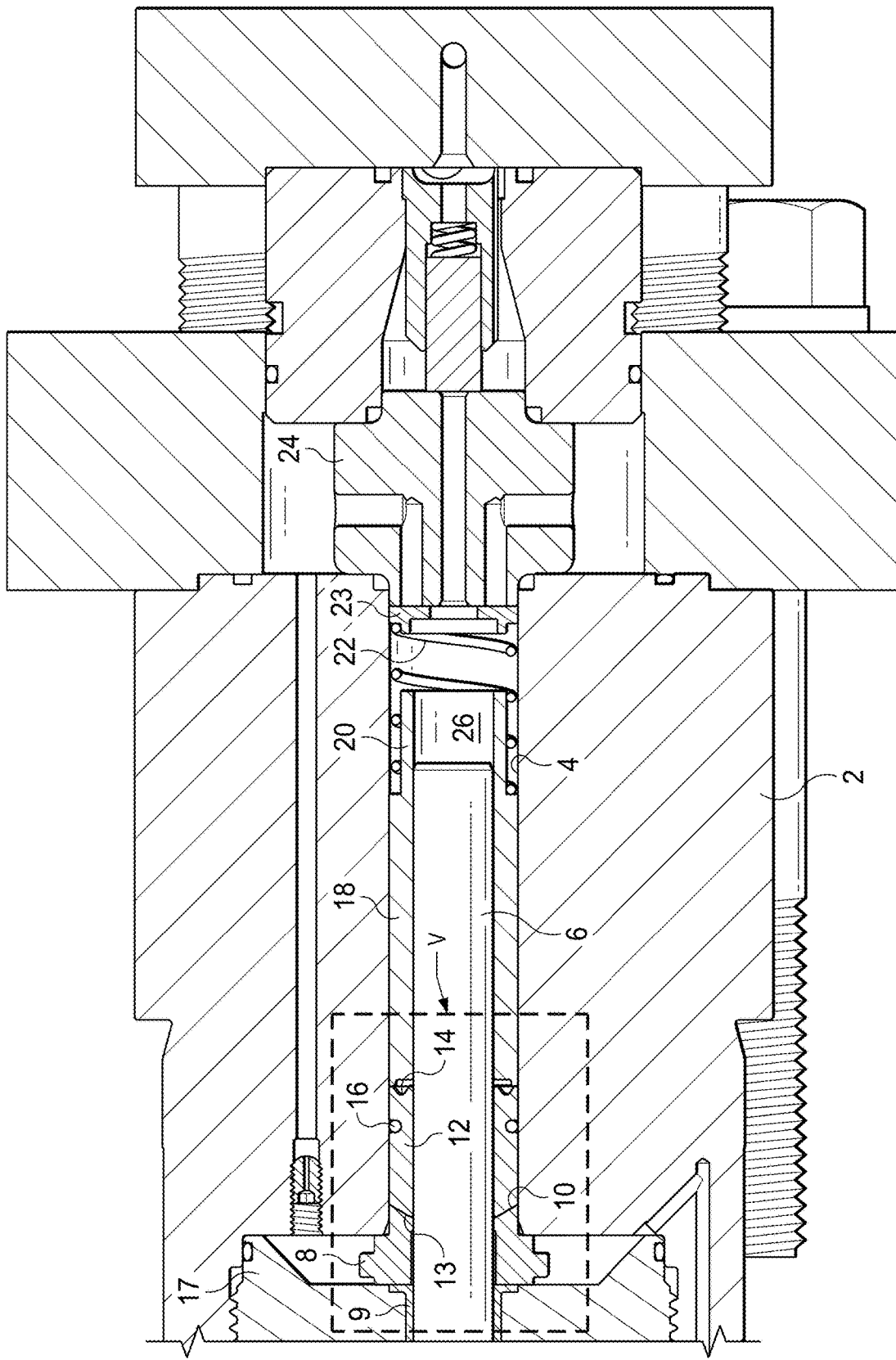
FIG. 1B is a schematic cross-sectional side view typical high pressure pump cylinder of FIG. 1A with a dashed portion representing a typical plunger seal system.
Figure 1C:
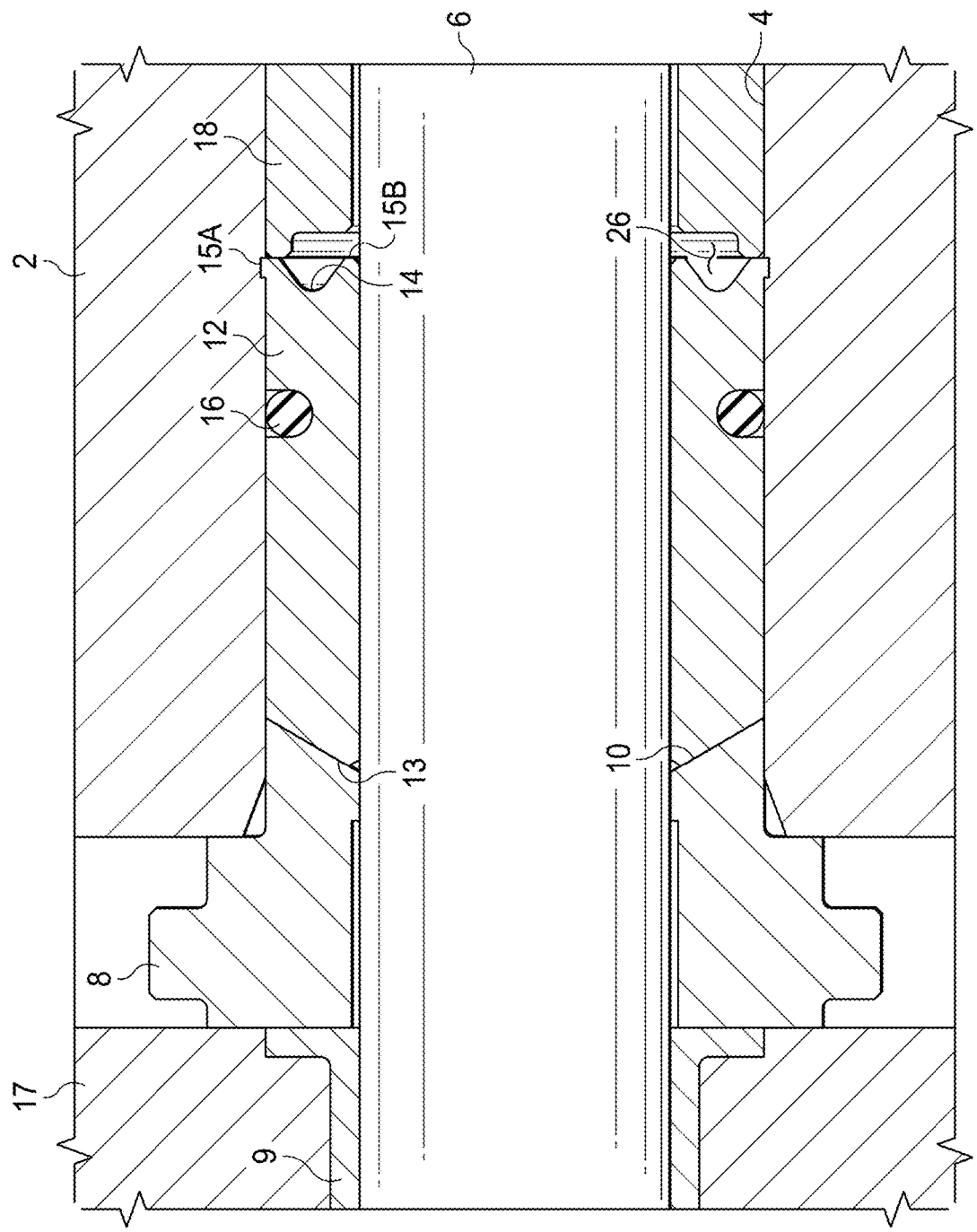
FIG. 1C is an enlarged schematic partial cross sectional side view of the high-pressure pump cylinder representing a typical plunger seal system in the dashed zone of FIG. 1B.
Figure 2:
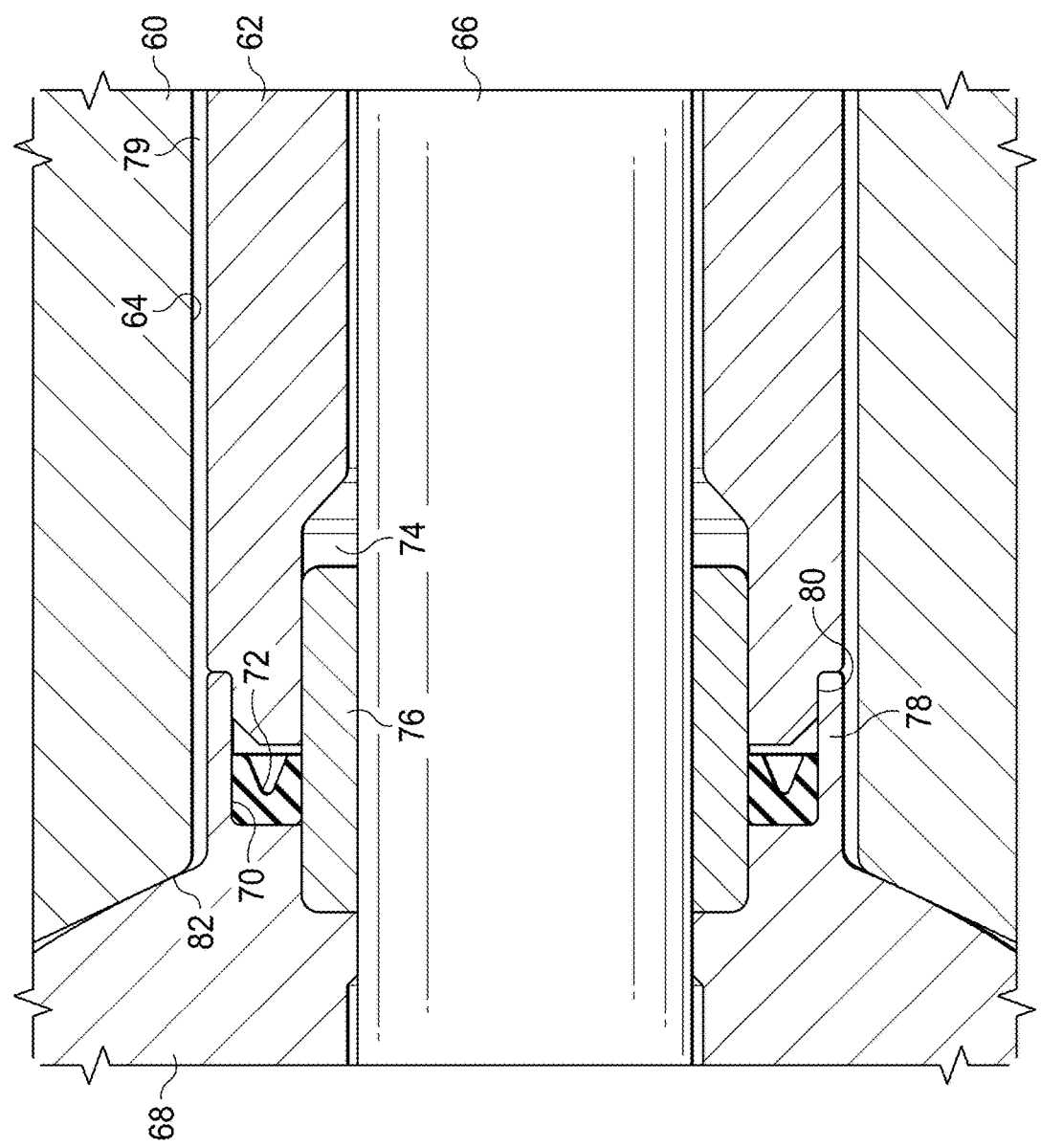
FIG. 2 is a schematic partial cross sectional side view of another typical plunger seal system.

The cylinder 32 can generally be assembled with a plunger seal system 30 of the invention described herein, and components described in FIGS. 1A-1C, such as a valve 23 with a valve seat 24 at a distal end and a spring 22. The spring 22 of FIGS. 1A-1C can similarly bias the spacer tube 56 into the annular volume of a pressure portion 26 of the cylinder between the plunger 36 and the cylinder bore 34 throughout the reciprocal movement of the plunger.

The plunger seal system 30 is configured to seal a plunger 36 slidably engaged in the cylinder bore 34. A guide bearing 38 supports the reciprocal motion of the plunger 36. A seat is coupled axially to the cylinder, such as threadably engaged, to restrain longitudinal movement of the plunger seal system in at least one direction. The seat 40 is formed with an extension 41 that extends into the cylinder bore 34. The seat 40 further is formed with a seat bore 43 sized for the plunger to slide therein. The seat 40 includes a seat end 44 with a conical shape facing a pressure portion 26. A backup nut 42 retains the guide bearing 38 and seat 40 in proper engagement with the cylinder and is releasably coupled with the cylinder. A backup ring 46 interfaces with the seat 40 and includes a backup end 48 with a reciprocal conical shape facing the seat end 44 of the seat 40. A distal end 49 (relative to the seat 40) of the backup ring 46 interfaces with a U-cup seal 52. The U-cup seal is oriented so that flaps 54A and 54B of the U-cup seal extend distally toward the pressure portion 26. A longitudinal sleeve 58 is disposed radially inward of the U-cup seal 52, backup ring 4, and a spacer tube 56, and radially outward of the plunger 36. The sleeve 58 abuts into a suitable pocket in seat 40 to restrict longitudinal movement in the proximal direction toward the seat 40 and fluid pressure acts on the distal end of the sleeve toward the pressure portion 26. In this design, the wetted parts are the plunger 36, sleeve 58, U-cup seal 72, spacer tube 56, and bore 64 of the cylinder 60. The backup ring 46 serves as a structural, non-wetted component, and interfaces with both the U-cup seal and the sleeve in sealing capacities.

Uniquely, the synergistic combination of the U-cup seal 52, backup ring 46, and sleeve 58 cover the gamut of pressures, while in contrast to prior art being fully able to function with general commercial tolerances for substantially longer life and ease of maintenance. The invention changes the high pressure packing 12 of FIGS. 1A-1B as a wetted component to the backup ring 46 on FIGS. 3-4 as a structural, non-wetted component. The backup ring 46 preserves its function of providing circumferential clamping forces to the plunger 36 through the contact region at its abutment with the seat 40 and achieves this clamping force indirectly through acting on the sleeve 58. This clamping force serves as a complement to the circumferential clamping force provided by U-cup seal 52 and the fluid pressure-wrapping around the sleeve 58 in the pressure portion 26.

Additionally, the axial compression to backup ring 46 from the pressure load acting on the U-cup seal 52, coupled with the axially fixed position of the seat 40, expands the backup ring 46 radially, so that it closes all radial gaps including gaps created by cylinder expansion due to pressure, and preserves the contiguous bounded region that resists extrusion of the U-cup seal. Thus, the U-cup seal life is dramatically extended in contrast to prior efforts in the field.

At low pressures, the flap 54A of the U-cup seal 52 can seal against the cylinder bore 34 and the flap 54B can seal against the sleeve 58 as a primary seal. At medium pressures, the U-cup seal presses against the backup ring 46, expanding the U-cup seal 52 with the flaps 54A and 54B, and increasing sealing capacity. At higher pressures, in addition to sealing by the U-cup seal, the backup ring 46 is compressed axially by a longitudinal force from the U-cup seal caused by the fluid pressure. The longitudinal force on the backup ring therefore deforms and expands the backup ring radially, including radially inward toward the sleeve 58 to compress the sleeve toward the plunger 36 and seal against the plunger 36. Further, fluid around the plunger 36 that is not precluded by the U-cup seal 52 can wrap around the sleeve 58 in an annulus 55 between the outside diameter of the sleeve 58 and an inside diameter of the spacer tube 56. At the higher pressures, the fluid pressure in the annulus acts on the sleeve to exert a further radially compressive force of the sleeve to clamp and seal around the plunger and complement the radial compressive force by the backup ring on the sleeve.

The plunger system is capable to seal at low pressures and very high pressures without substantial extruding, if any, through gaps in the assembly. Thus, the backup ring 46, being able to function independently from the U-cup seal 52 and the sleeve 58, affects each of the U-cup seal and the sleeve at different phases of the compression cycle. The backup ring 46 can provide both backup support for the U-cup seal 52 to expand to seal at a medium pressure and constrict around the sleeve 58 when axially compressed by the U-cup seal to radially clamp the sleeve to seal around the plunger a higher pressures. Thus, the flexible members flex at lower pressure to effect the seal, and the more rigid members flex at the higher pressures to continue the sealing that the less rigid members could not seal.

During installation, the U-cup seal 52 can be positioned part way on the sleeve 58, so that a flat back of the U-cup seal is away from the pressure portion 26. The backup ring 46 is positioned on the sleeve 58 adjacent to the U-cup seal 52, with the matching features in contact. A portion of the sleeve 58 is visible on either side of the backup ring 46 and U-cup seal 52. The combination U-cup seal 52, backup ring 46 and sleeve 58 are placed into a receiving end of seat 40. When the sleeve 58 is fully engaged with a mating pocket in seat 40, the contacting U-cup seal 52 and backup ring 46 combination are slid along the sleeve 58 until the wedge portion on backup ring 46 rests fully in the conical mating surface of the seat 40. The plunger 36 can slide with minimal effort through the sleeve for installation.

During operation of the pump, specifically the pumping portion of the reciprocation, the pumped fluid presses against the U-cup seal 52, producing pressure forces. The pressure forces act on the sealing lips of U-cup seal 52, expanding them radially outward against the cylinder 32, radially inward against the sleeve 58 to create an initial clamping force on plunger 36, and axially rearward, away from the pumped fluid, pushing the U-cup seal 52 against the backup ring 46. This pressure force further causes the nesting conical surface on the seat end 44 combined with the reciprocal conical surface of the backup end 48 to respond by sliding radially inwardly toward the sleeve 58. The radially inward motion compresses the sleeve 58 against the plunger 36 with a circumferential clamping force that is supplemental to the initial clamping force. A seat ring 50 of the seat 40 inside diameter has a closer sliding fit to plunger 36 compared to the remainder of the seat 40 and is of short axial length, The seat ring 50 helps reduce wear if there is misalignment, and helps prevent extrusion of the sleeve 58 through the space between seat 40 and plunger 36 that would otherwise occur due to the high axial load from the pressure. The axial pressure forces exerted through U-cup seal 52 onto backup ring 46 deform the backup ring shape such that it is shortened axially, expands radially outwardly to press tightly against the cylinder 32 inside diameter, and expands radially inwardly to clamp onto sleeve 58, thus providing increased sealing effort onto plunger 36. The material of backup ring 46 has adequate Poisson's ratio properties to allow for this deformation, while still possessing the structural strength to withstand the pressure loads.

On the pumping stroke, the U-cup seal 52, backup ring 46, and pressure-wrapped portion of sleeve 58 from the backup ring radial inward expansion creates the desired liquid-tight sealing effect on plunger 36. On the retraction stroke, when the fluid pressure is comparatively very low, the sleeve 58 relaxes when the pressure load is removed, and the sliding fit of the sleeve 58 on plunger 36 is restored, reducing friction and extending service life of the seal assembly.

Figure 5:
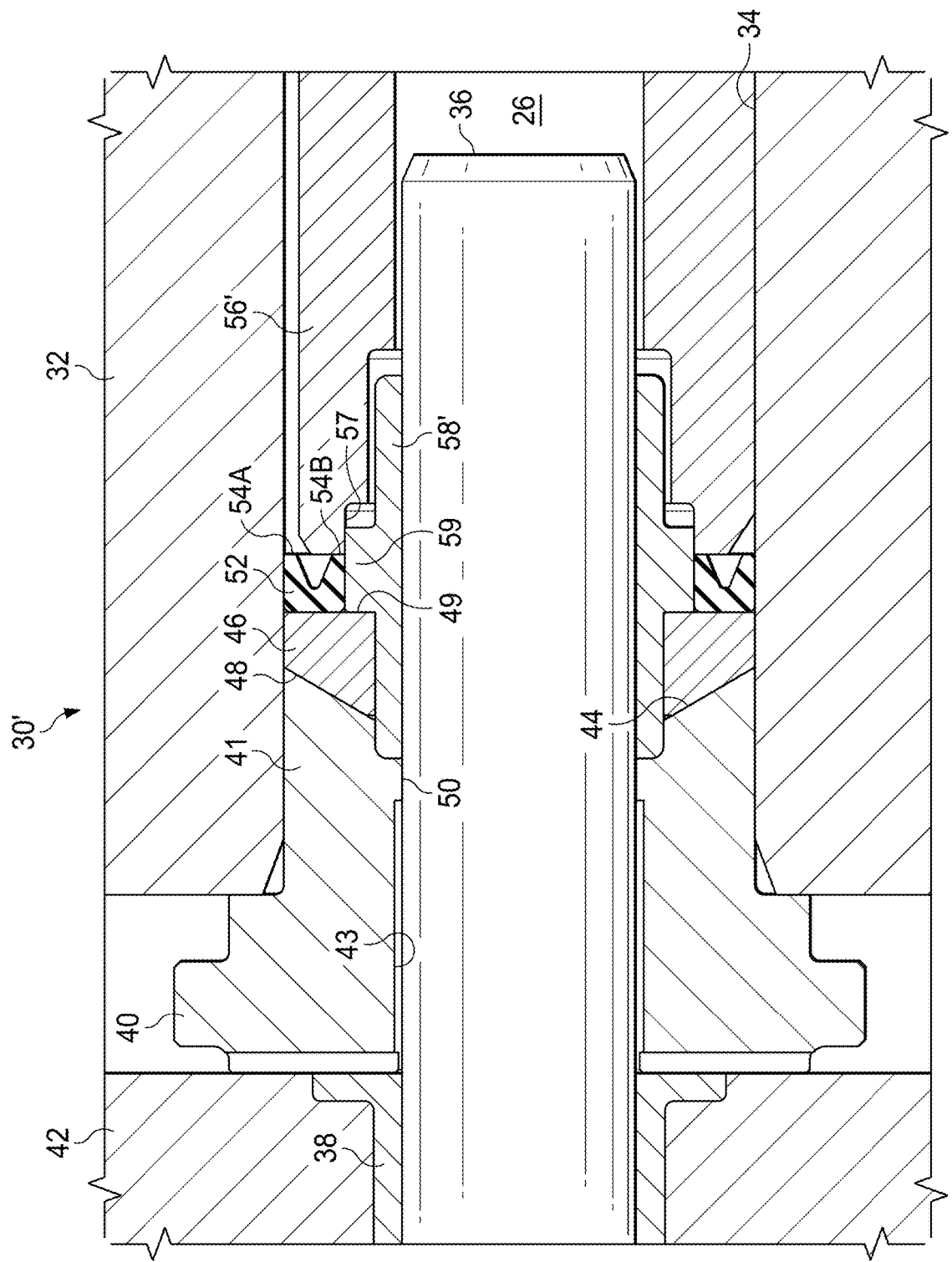
FIG. 5 is a schematic partial cross sectional side view of an exemplary alternative plunger seal system of the invention.

FIG. 5 is a schematic partial cross sectional side view of an exemplary alternative plunger seal system of the invention. The embodiment functions similarly as described for FIGS. 3 and 4 and the components are similarly labeled. However, this embodiment illustrates how different diameters of plungers 36 can be accommodated using the same cylinder bore 34. The inner diameters can be adjusted to fit the outer diameter of the plunger with the appropriate clearances and fit. In addition, a sleeve 58' and a spacer tube 56' can be modified to include steps to retain the function but allow for the diametrical variance. The sleeve 58' can include a sleeve step 59 of a diameter to interface with the U-cup seal 52 as described above. Thus, the same U-cup seal with the same outside and inside diameters could be used. The outside diameter of the sleeve could also be the same, other than the step, so that the backup ring 46, when axially compressed by the U-cup seal as described, could still apply a compressive force on the sleeve in the thinner portion or the sleeve as in FIGS. 3 and 4. Similarly, the spacer tube 56' can include a spacer tube step 57 to accommodate the sleeve step 59 and reduce fluid volume in the annuli between the plunger outside diameter and the cylinder bore inside diameter. The annulus 55 between the sleeve 58' and the spacer tube 56' can allow some pressurized fluid (that is not precluded by the seal 52) to compress with a radial force the sleeve radially toward the plunger and seal on the plunger as described above.

Figure 6:
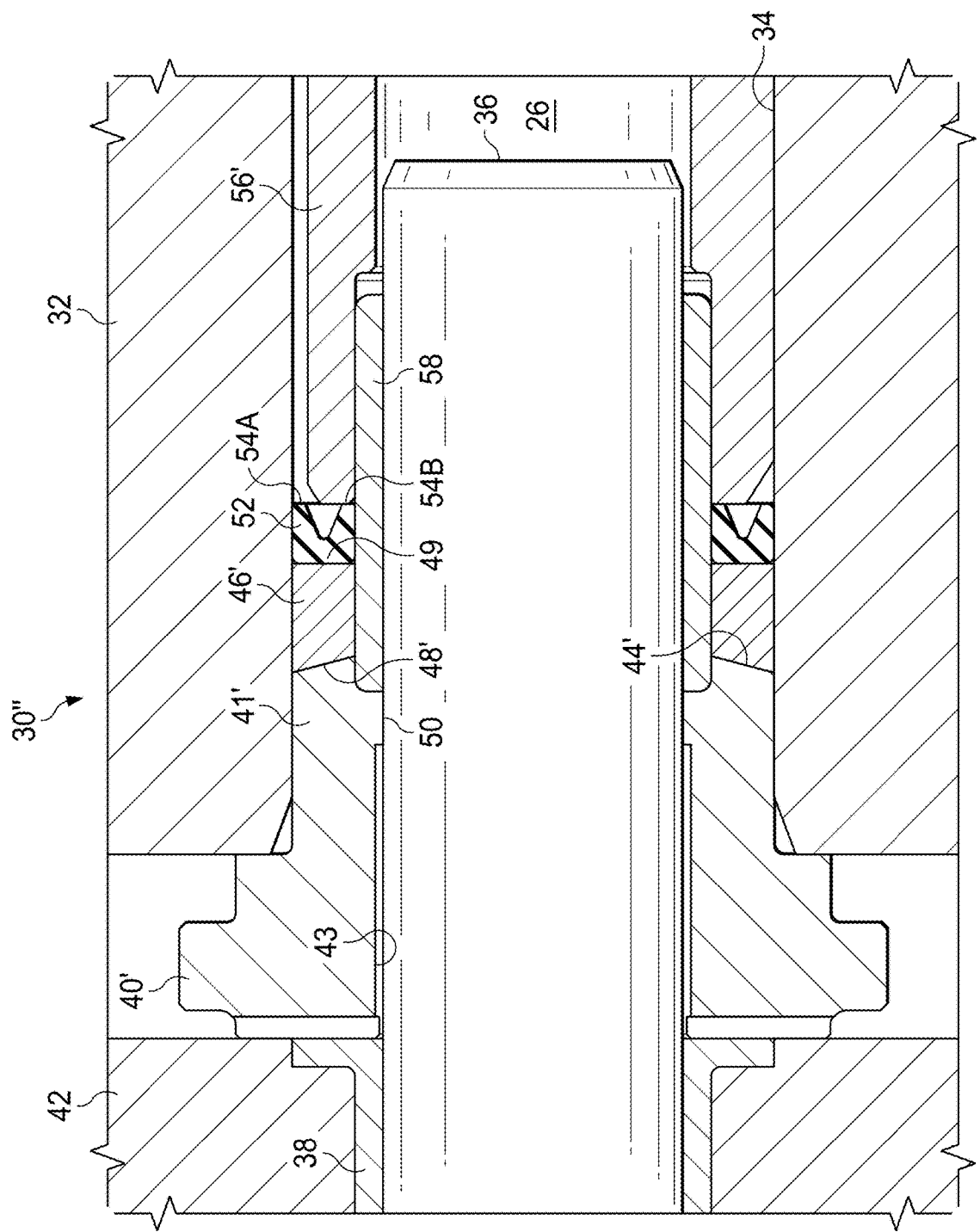
FIG. 6 is a schematic partial cross sectional side view of another exemplary alternative plunger seal system of the invention.

FIG. 6 is a schematic partial cross sectional side view of another exemplary alternative plunger seal system of the invention. The embodiment functions similarly to the embodiment in FIGS. 3-5 and the components are similarly labeled. However, the conical face of the seat end 44' of the seat extension 41' of the seat 40' and the conical face of the backup end 48' of the backup ring 46' are angled so that axial compression on the backup ring biases the ends 44' and 48' in opposite radial directions than the other described embodiments. During operation, the pumped fluid presses against the U-cup seal 52, producing pressure forces. The pressure forces act on the sealing lips of U-cup seal 52, expanding them radially outward against the cylinder 32, radially inward against the sleeve 58 to create an initial clamping force on plunger 36, and axially backward, away from the pumped fluid, pushing the U-cup seal 52 against the backup ring 46'. This pressure force further causes the nesting conical surface of the backup end 48', combined with the reciprocal conical surface on the seat end 44', to respond by sliding radially outwardly toward the wall of the cylinder bore 34. The radially outward motion continues and the compressed backup ring fills any radial space toward the cylinder 32 and radially compresses against the sleeve 58 to in turn radially compress against the plunger 36 with a circumferential clamping force that is supplemental to the initial clamping force. This design has a shaping effect on the backup ring 46 to effect a seal at the outside diameter of the sleeve that is limited to the Poisson's ratio of the material. In contrast, the conical orientation of FIGS. 3 and 4, a pressure force on the backup ring structurally compresses the backup ring onto the sleeve, while the Poisson's effect is limited to the bore diameter for sealing against the bore. The effect from the conical "sliding" and Poisson's effect combination in FIG. 6 is biased toward the cylinder wall, while the conical orientation shown in FIGS. 3-5 biases these effects against the plunger, providing for a preferred sealing effect.

Other and further embodiments utilizing one or more aspects of the inventions described above can be devised without departing from the disclosed invention as defined in the claims. For example, various materials for the components can be used depending on the fluid being pumped, the pressure regions being used, and other factors. Additional variations can include replacing the U-cup seal with an O-ring, supported by a suitable backup ring, to activate the sealing action in the low-pressure energizing step and, at higher pressures, exert sufficient pressure load on a suitably formed backup ring and a sleeve to effect the sealing at the higher pressures. Other embodiments have been contemplated.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A plunger seal system for a pump having a cylinder with a longitudinal bore having a bore diameter and a plunger having an outer diameter slidably engaged in the bore, the seal system comprising:
    a cylindrical seat configured to be coupled to the cylinder with an extension having an outer diameter smaller than the cylinder bore diameter that extends into the cylinder bore when installed in the cylinder and restrained longitudinally to the cylinder and an inner diameter larger than the plunger outer diameter to allow the plunger to slide therethrough, the seat having a seat end with a conical face disposed toward a pressure portion of the cylinder;
    a backup ring configured to abut the cylindrical seat end when installed in the cylinder and having an outer diameter smaller than the cylinder bore to allow insertion into the cylinder bore and an inner diameter larger than the plunger outer diameter to allow the plunger to slide therethrough, the backup ring having a backup end with a reciprocal conical face to the conical face of the seat end that presses the inner diameter of the backup ring radially inward when the backup ring is pushed longitudinally toward the seat end and the backup ring having a distal end disposed toward the pressure portion;
    a seal abuts the distal end of the backup ring and having a cylinder portion with an outer diameter smaller than the cylinder bore to allow insertion into the cylinder bore and an inner diameter larger than the plunger outer diameter to allow the plunger to slide therethrough, the seal having a second end disposed toward the pressure portion, the second end having a circumferential groove formed in a face of the second end thereby forming a radially inward longitudinal flap configured to seal inwardly against an inner circumferential surface and a radially outward longitudinal flap configured to seal against the cylinder bore;
    a sleeve having an outer diameter smaller than the inner diameter of the backup ring and the seal and an inner diameter larger than the plunger outer diameter to allow the plunger to slide therethrough, and the sleeve disposed radially inward of the backup ring and seal on a first portion of the sleeve proximal to the seat end and abutting the seat to restrain longitudinal movement toward the seat, the backup ring and the radially inward longitudinal flap contacting the outer diameter of the sleeve, when installed in the cylinder bore and through at least the inner diameters of the backup ring and seal, the sleeve having a second portion proximal to the pressure portion and exposed to cylinder bore pressure when present.

2. The system of claim 1, further comprising a spacer tube having a first inner diameter configured to allow the plunger to slide therethrough and a second inner diameter radially outward of the sleeve, and an outer diameter configured to extend into the cylinder bore, the spacer tube having a first end that is biased against the second end of the flexible seal with the flaps.

3. The system of claim 2, further comprising a spring coupled to an end of the spacer tube in the pressure portion configured to bias the spacer tube toward the seal.

4. A method of sealing a plunger slidably engaged in a cylinder bore of a pump, having a cylinder seat at least partially inserted into the cylinder bore, and a cylindrical backup ring, seal, and sleeve inserted into the cylinder bore adjacent the cylinder seat, comprising:
    pressurizing the cylinder in a pressure region of the cylinder longitudinally distal from the cylinder seat, the cylinder seat coupled to the cylinder with an extension having an outer diameter smaller than the cylinder bore and restrained longitudinally within the cylinder and having an inner diameter sized to allow the plunger to slide therethrough, the cylinder seat having a seat end having a conical face disposed toward the pressure region of the cylinder;
    activating the seal against the cylinder bore and against the sleeve by applying a first pressure to the seal fluidicly coupled to the pressure region,
    the seal having an inner diameter radially outward from the plunger, the seal having a first end disposed toward the backup ring and a second end disposed toward the pressure region, the second end having a circumferential groove formed in a face of the second end thereby forming a radially inward longitudinal flap configured to seal radially inwardly against an outer diameter of the sleeve and a radially outward longitudinal flap configured to seal against the cylinder bore, the sleeve having the outer diameter smaller than an inner diameter of the backup ring and the seal and an inner diameter larger than the plunger outer diameter to allow the plunger to slide therethrough, and the sleeve disposed radially inward of the backup ring and seal on the plunger with a first portion of the sleeve proximal to the seat end and abutting the seat end to restrain longitudinal movement toward the cylinder seat, the radially inward longitudinal flap contacting the outer diameter of the sleeve;

the backup ring having an outer diameter to allow insertion into the cylinder bore and the inner diameter larger than the plunger outer diameter to allow the plunger to slide therethrough, the backup ring having a reciprocal conical face contacting the conical face of the cylinder seat, the backup ring having a distal end disposed toward the pressure region, the distal end contacting the seal, activating the backup ring for sealing by applying a second pressure in the pressure region against the seal that is a higher pressure than the first pressure, forcing the seal longitudinally against the backup ring, and compressing the backup ring longitudinally to expand the backup ring radially inward toward the sleeve to seal against the cylinder bore and the sleeve; and activating the sleeve for further sealing by applying a third pressure that is a higher pressure than the second pressure against the seal in an annulus that is fluidicly coupled to the pressure region and radially outward from the sleeve, forcing the seal more against the backup ring, and compressing the backup ring more longitudinally to expand the backup ring more radially to seal against the cylinder bore, thereby compressing the sleeve radially to seal against the plunger.

5. The method of claim 4, further comprising unsealing the plunger, comprising:

depressurizing the cylinder;
allowing the sleeve to relax radially;
allowing the backup ring to expand relax radially; and
allow the seal to unseal against the cylinder wall and sleeve.

6. A plunger seal system for a pump having a cylinder with a longitudinal bore and a plunger slidably engaged in the bore, the seal system comprising:

a cylindrical seat configured to be coupled to the cylinder having an extension with an outer diameter configured to extend into the cylinder bore and be restrained longitudinally and an inner diameter configured to allow the plunger to slide therethrough, the seat having a seat end having a conical face disposed toward a pressurized portion of the cylinder;

a backup ring disposed adjacent to the cylindrical seat and having an outer diameter configured to allow insertion into the cylinder bore and an inner diameter radially outward from the plunger, the backup ring having a backup end with a reciprocal conical face to the conical face of the seat end of the cylindrical seat and a distal end disposed toward the pressurized portion;

a seal disposed adjacent the backup ring and having a cylinder portion with an outer diameter configured to extend into the cylinder bore and an inner diameter radially outward from the plunger, the seal having a first end disposed toward the backup ring and a second end disposed toward the pressurized portion, the second end having a circumferential groove formed in a face of the second end thereby forming a radially inward longitudinal flap configured to seal inwardly against an inner circumferential surface and a radially outward longitudinal flap configured to seal against the cylinder bore;

a sleeve longitudinally aligned with the cylindrical seat, backup ring, and seal and having an outer diameter radially inward of the backup ring and the seal, and an inner diameter configured to allow the plunger to slide therethrough; and a spacer tube having a first inner diameter configured to allow the plunger to slide therethrough and a second inner diameter radially outward of the sleeve, and an outer diameter configured to extend into the cylinder bore, the spacer tube having a first end that is biased against the second end of the seal with the flaps.

* * * * *